Nov. 21, 1961 W. W. FUNK 3,009,282
APPARATUS FOR DISTRIBUTING POWDERED MATERIAL
Filed July 10, 1957 6 Sheets-Sheet 1

FIG_1

INVENTOR
WELKER W. FUNK
BY Hans G. Hoffmeister
ATTORNEY

Nov. 21, 1961 W. W. FUNK 3,009,282
APPARATUS FOR DISTRIBUTING POWDERED MATERIAL
Filed July 10, 1957 6 Sheets-Sheet 4

INVENTOR
WELKER W. FUNK

BY Hans G. Hoffmeister.
ATTORNEY

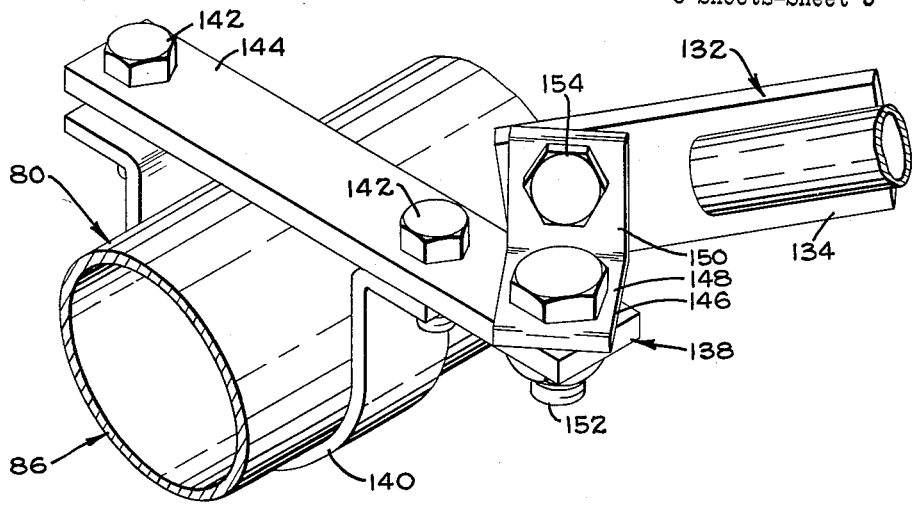
FIG_5
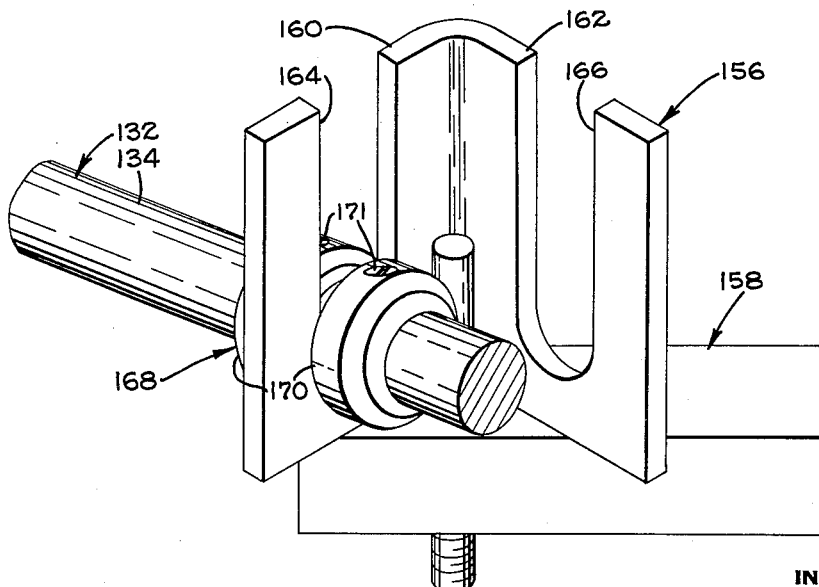
FIG_6

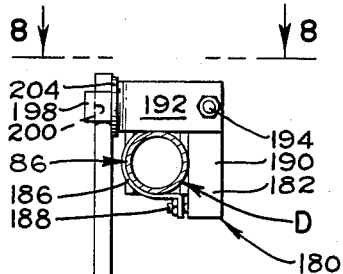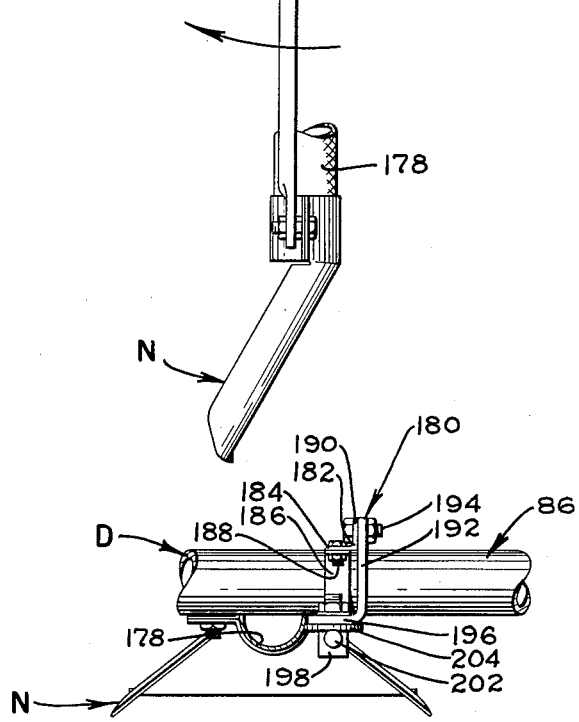

United States Patent Office 3,009,282
Patented Nov. 21, 1961

3,009,282
APPARATUS FOR DISTRIBUTING
POWDERED MATERIAL
Welker W. Funk, Medina, N.Y., assignor to FMC
Corporation, a corporation of Delaware
Filed July 10, 1957, Ser. No. 670,898
28 Claims. (Cl. 43—148)

The present invention relates to apparatus for distributing powdered material and more particularly pertains to apparatus of the type in which material, such as pesticide, is discharged from nozzles mounted on a boom.

Pesticidal materials are commonly distributed to the plants of row crops by the use of apparatus which is provided with discharge nozzles that are disposed at a predetermined height adjacent the top of the plants. The nozzles of such apparatus are frequently mounted on a vertically adjustable boom and are spaced therealong so that one or more of the nozzles will be disposed between adjacent rows of plants below the boom.

It is an object of the present invention to provide an improved boom-type apparatus for distrbuting powdered material.

Another object of the present invention is to provide improved adjusting means for a boom in a pesticide distributing apparatus.

Another object is to provide an improved mounting for a discharge nozzle in a pesticide distributing apparatus.

Another object is to provide an improved trailer by means of which pesticide distributors may be transported.

These and other objects and advantages will become apparent from the following description taken in connection with the accompanying drawings in which:

FIGS. 5 and 6 are fragmentary perspectives, drawn at an enlarged scale, showing certain structure pertaining to the adjustment of the booms.

FIG. 7 is an enlarged vertical section taken along line 7—7 of FIG. 2 and particularly illustrating the nozzle mounting.

FIG. 8 is a horizontal section taken along line 8—8 of FIG. 7.

Figure 1:
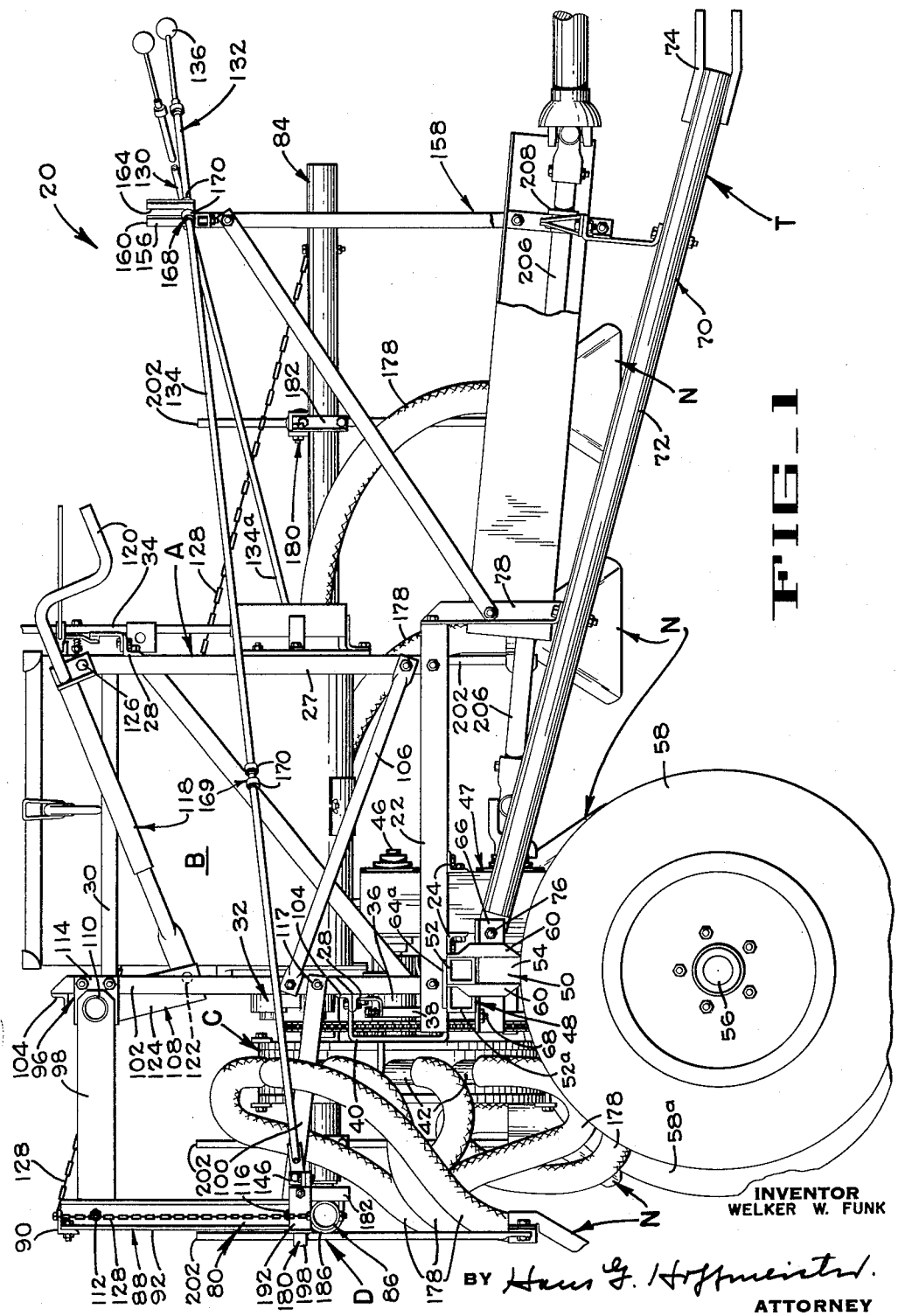
FIG. 1 is a side view, partly broken away, of the apparatus of the present invention.
Figure 2:
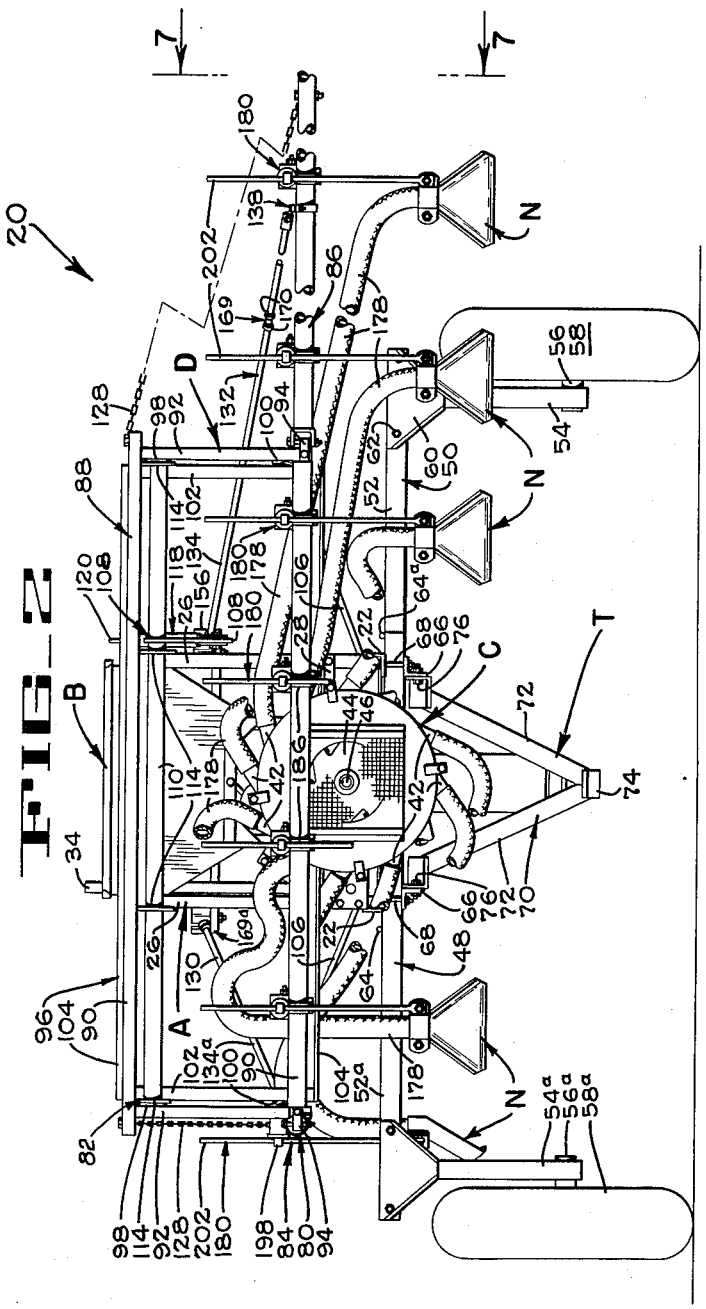
FIG. 2 is a rear end view of the apparatus shown in FIG. 1 and drawn at a reduced scale, certain parts thereof being broken away.
Figure 3:
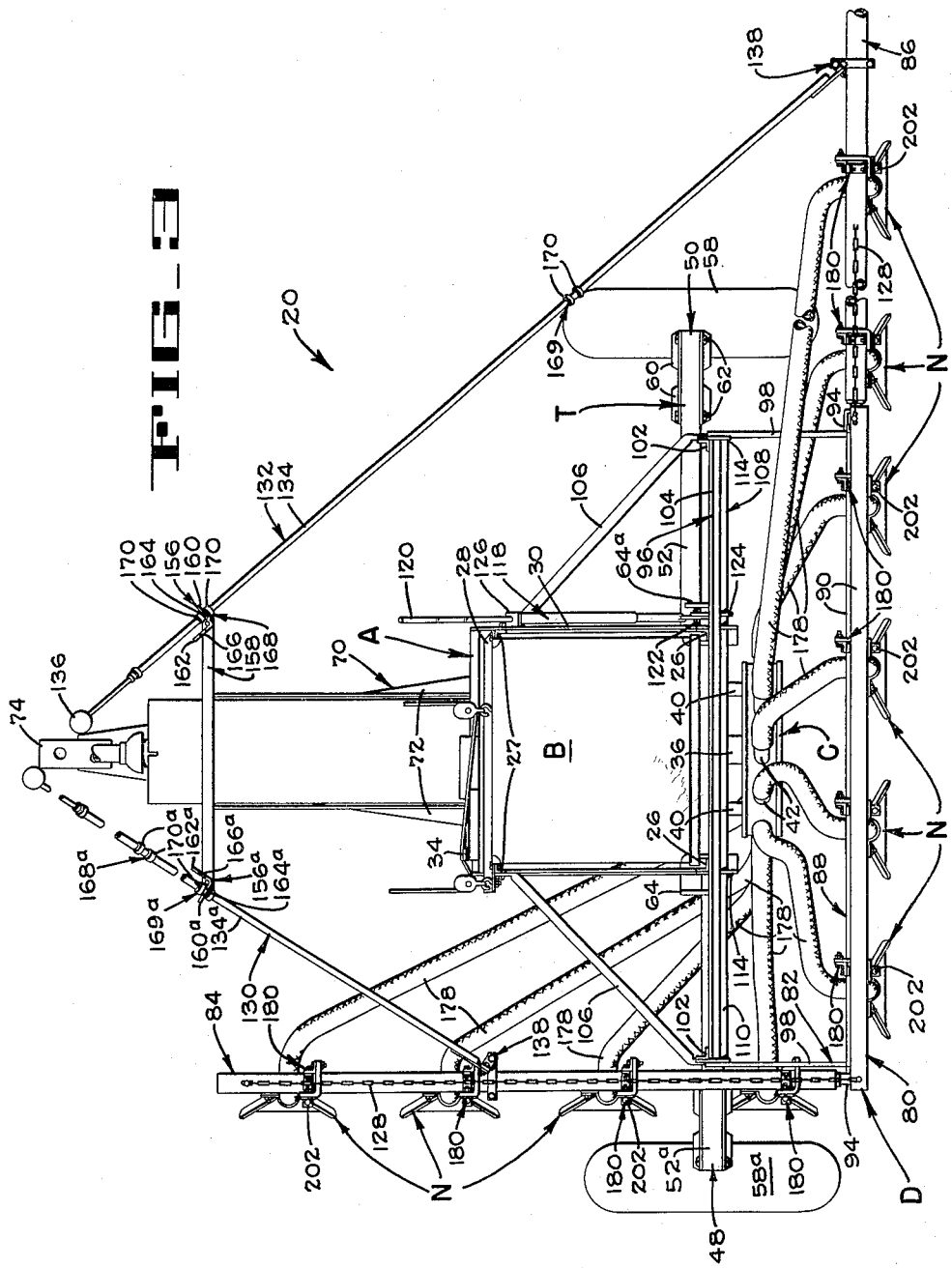
FIG. 3 is a plan of the apparatus of the present invention drawn at the same scale as FIG. 2, with certain parts being broken away.

Referring to FIGS. 1, 2 and 3, the present pesticide distributor apparatus 20 comprises a frame structure A mounted on the rear end of a trailer T. A supply hopper B for pesticide dust is mounted in the frame A, and dust that is stored in the hopper B is conducted rearwardly therefrom to a blower C for subsequent application to the plants of row crops. An adjustable boom structure D carries nozzles N through which dust is delivered to the immediate vicinity of the plants as the apparatus is moved along the rows of plants.

The frame structure A comprises two horizontal beams 22 (FIGS. 1 and 2) which are disposed longitudinally of the apparatus at opposite sides of the frame and are rigidly interconnected by means of a plurality of transverse horizontal beams 24. Two posts 26 and 27 (FIG. 2), which are spaced apart longitudinally of the beams 22, are fixed at their lower ends to each beam 22 and project vertically upwardly therefrom. The vertical posts are interconnected by transversely extending tie bars 28 at the front and rear of the apparatus as well as longitudinal tie bars 30 at the sides of the frame.

The hopper B of the distributing apparatus 20 is disposed between the upright posts 26 and 27 and is supported by the various tie bars 28 and 30. A dust feed mechanism 32 associated with the hopper is provided for purposes of maintaining the dust in the hopper in a loose condition and to control the rate at which the dust is discharged from the hopper. The dust feed mechanism 32, which may be of any well known type is driven in a manner later to be described. The flow of dust from the feed mechanism 32 can be controlled by movement of a lever 34 which is mounted at the front of the hopper.

Located adjacent the rear of the hopper B is an elongated blower intake tube 36. A suitable bracket 38 mounts the tube 36 in horizontal position on the frame structure A. Adjacent its front end, the tube 36 is in communication with the dust feed mechanism 32 of the hopper B so that dust from the hopper is delivered into the tube 36.

The blower C is disposed substantially coaxially with respect to the intake tube 36 and is mounted in fixed position on the frame structure A, by means of brackets 40, so that the rear end of the tube 36 projects into the blower. The periphery of the blower is provided with a plurality of discharge nipples 42 (FIG. 2). Interiorly of the blower C is an impeller 44 which is mounted upon a drive shaft 46 that projects through the intake tube 36 and is operatively connected to a transmission 47. The transmission is securely supported in the frame structure A by means of two of the adjacently disposed transverse beams 24 (FIG. 1). Upon operation of the impeller, air is drawn through the tube 36 and into the blower for subsequent discharge therefrom through the nipples 42. Dust that enters the discharge tube 36 from the hopper B is entrained in the air passing through the tube 36 into the blower C.

Figure 4:
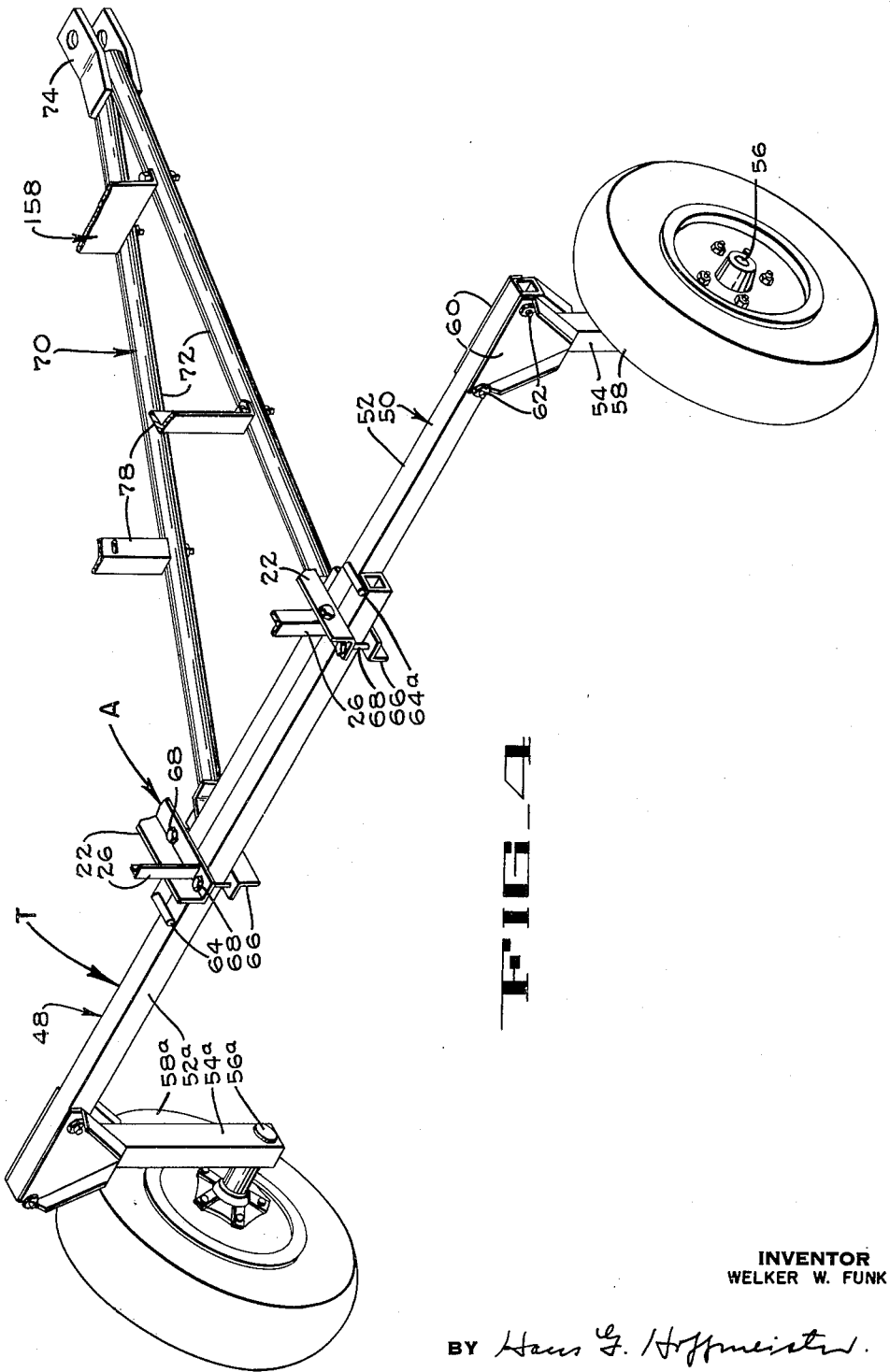
FIG. 4 is an enlarged perspective showing the trailer on which the apparatus of the present invention is mounted.

The trailer T upon which the duster 20 is mounted comprises two identical body members 48 and 50 (FIGS. 2 and 4). Since the trailer body members 48 and 50 are similar, only the body member 50 at the right-hand side of the duster will be described in detail. Where it is necessary to refer to specific parts of the member 48, the reference numeral given to the corresponding parts of the member 50 will be used but with the addition of an "a" as a suffix mark. The body member 50 is of reclining L-shape and comprises a horizontal slide bar 52 to which, adjacent one end, a vertical leg 54 is attached. A horizontal spindle 56, upon which a ground engaging wheel 58 is rotatably mounted, projects in parallel relation with respect to the slide bar 52 outwardly of the trailer from the side of the leg 54. The leg 54 has two spaced plates 60 at its top end that are disposed at the front and rear of slide bar 52 adjacent one end. Two bolts 62, which extend through the slide bar and through the spaced plates, are provided for the purpose of mounting the leg 54 in fixed position on the slide bar. The above described manner of mounting the leg 54 permits the legs 54 and 54a to be mounted with the spindles 56 and 56a extending inwardly of the trailer if necessary.

At the end of the slide bar 52, opposite to the end on which leg 54 is mounted, is a stud 64 that is affixed to the top of the bar and projects horizontally from one side of the bar in a direction normal thereto. When the trailer body members 48 and 50 are arranged in cooperative supporting relationship beneath the frame structure A, the slide bars 52 and 52a are arranged in side by side position with the stud 64 on the bar 52 of the body member 50 overlying the bar 52a, and the stud 64a on the bar 52a of the body member 48 overlying the bar 52.

When the frame structure A of the duster is mounted on the trailer, the rear ends of the longitudinal beams 22 rest upon the juxtaposed slide bars 52 and 52a between the laterally spaced studs 64 and 64a (FIG. 4). A length of angle iron 66, which extends longitudinally of the duster, is located below the juxtaposed portion of the bars 52 and 52a of the body members 48 and 50 in alignment with the beams 22 of the frame structure A. Two bolts 68, one of which is located at opposite ends of each of the angle irons 66, extend through each angle iron and the associated beam 22 and serve to releasably clamp the bars 52 and 52a of the trailer body members 48 and 50 securely against endwise displacement thereof with respect to the frame structure A.

Extending forwardly from the body members 48 and 50 is a tongue 70 by which the trailer is attached to a tractor (not shown) so that the duster may be moved from place to place. The tongue comprises two tubular members 72 that diverge rearwardly from a clevis 74. At the end of the tongue 70 remote from the clevis each tubular member 72 is pivotally connected to the forward end of one of the angle irons 66 as by a bolt 76 (FIGS. 1 and 2). When the tongue has been disposed at a suitable inclination with respect to the frame structure A so that the clevis 74 can be attached to the tractor (not shown), spacers 78 (FIGS. 1 and 4) which extend between the tubular members 72 and the front of the frame structure A are fixed in place.

At times it may become necessary to change the spacing of the wheels 58 and 58a in order that the tread of the trailer will conform to the spacing of different crop rows. In making such an adjustment, the clamping bolts 68 are loosened so that the slide bars 52 and 52a can be moved endwise. Since the weight of the frame A and the apparatus mounted thereon bears entirely upon the body members 48 and 50, the trailer would tend to collapse as the bars 52 and 52a are slidably adjusted when the angle irons 66 are not held in clamping relation with the bars 52 and 52a by the bolts 68. However, the manner in which the studs 64 and 64a overlie and have bearing engagement with the bars 52a and 52, respectively, prevents any possible collapse of the trailer or binding of the bars with the clamping structure during endwise sliding movement of the bars 52 and 52a during adjustment of the trailer tread.

The boom structure D which is disposed adjacent the blower C comprises an articulated boom 80 that comprises three main parts, a center section 82 and opposite end sections 84 and 86. The center section 82 is in the form of an elongated rectangular frame 88 that extends transversely of the duster. The frame 88 is disposed substantially vertically and has a bar 90 along both the top and bottom edges. At the ends of the bars 90 are vertically extending members 92 which form the opposite ends of the frame 88. The boom sections 84 and 86 are attached to the opposite ends of the bottom bar 90 of the frame 88 by means of universal joints 94. This manner of mounting the end sections 84 and 86 permits them to be disposed either in axial alignment with respect to the bar 90 or in any desired angular relation thereto.

Each end of the center boom section 82 is pivotally connected to a rigid support frame 96 by a pair of upper arms 98 (FIGS. 1 and 2) disposed adjacent the top of the frames 88 and 96 and a pair of lower links 100 adjacent the bottom of the frames (FIGS. 1 and 2). The frame 96 is a rectangular member comprising two opposite end members 102 which are disposed substantially vertically and are rigidly connected by upper and lower horizontal members 104. Suitable rigidity is given to the linkage support frame 96 by two angle braces 106, one of which is disposed at each side of the present apparatus. The upper and lower horizontal members 104 are secured, as by bolting, to the vertical posts 26 of the frame structure A.

A control lever 108 for raising and lowering the boom comprises a horizontal pivot tube 110 which is disposed transversely of the duster at the top of the frame 96.

The pivot tube 110 is rotatably mounted in a plurality of bearing plates 114 (FIGS. 1 and 2) that are attached adjacent the upper edge of the end members 102 of frame 96 and to the vertical posts 26 of frame A. The previously-mentioned upper arms 98, which are pivotally attached by bolts 112 to the vertical members 92, are part of the control lever 108 and are welded to and project laterally from the pivot tube 110 toward the boom frame 88. The lower links 100, which are of substantially the same length as the arms 98, are provided for the purpose of maintaining substantial vertical alignment of the boom frame 88 during raising and lowering of the entire articulated boom 80. The ends of each link 100 are attached as at 116 to the frame 88 and at 117 to the frame 96. Raising and lowering of the boom is accomplished by means of a screw jack 118 of well known construction that is axially adjustable by means of a crank 120. The jack at one end is pivotally attached, as at 122, to the free end of a lever arm 124 that is welded to and projects downwardly from the pivot tube 110 toward the front of the duster at the right hand side thereof. At its other end the jack is pivotally attached, as at 126, to one of the posts 27 near its top end. By turning the crank 120 of the jack 118 in the proper direction, the control lever 108 is turned about the axis of the pivot tube 110 and the boom 80 is accordingly raised or lowered.

In the present boom structure D the opposite end sections 84 and 86 are each guyed by a length of chain 128 to the adjacent end of the boom frame 88. The guy chains 128 are attached to the upper corners of the boom frame 88 and extend from the corners to points adjacent the remote end of the respective boom sections 84 and 86, and the chains are of such length as to dispose the respective boom sections substantially horizontally. This manner of supporting the boom sections permits them to be pivoted horizontally so as to be disposed in either the laterally extending position of boom section 86 (FIG. 3) or in the retracted position of boom section 84 (FIG. 3). Additionally, the guy chains 128 permit the boom sections 84 and 86 to be raised in order to clear obstructions that may be encountered in the path of the duster.

Booms controls 130 and 132 (FIGS. 1, 3, 5 and 6) are provided for the boom end sections 84 and 86, respectively. Since the boom controls 130 and 132 are similar, only the control 132 at the right-hand side of the duster will be described in detail. Where it is necessary to refer to specific parts of the control 130, the reference number given to the corresponding part of the boom control 132 will be used but with the addition of an "a" as a suffix mark. The boom control 132 comprises an elongated, rigid rod 134 which is provided at one end with a knob 136 that serves as a handle. The other end of the rod 134 (FIG. 5) is pivotally connected to the end section 86 of the boom 80 in such a way that relative universal pivoting movement between the control rod 134 and the end section 86 is obtained. A bracket 138 (FIGS. 3 and 5), on the end section 86 to which the control arm 134 is connected, comprises a U-shaped strap 140 that fits closely about the lower side of the end section 86. The strap 140 is held in clamping relation about the end section by bolts 142 that pass through the ends of the strap as well as through a rigid bar 144 that overlies the end section. An angle clip 146 having both a horizontal leg 148 and a vertical leg 150 is pivotally attached to the bar 144 by means of a bolt 152 that extends through the leg 148 and through the bar adjacent the front end thereof. This manner of attaching the angle clip 146 to the bar 144 permits movement of the clip about a vertical axis. The end of the control rod 134 is pivotally attached to the clip 146 by means of a bolt 154 that extends through both the rod 134 and the vertical leg 150 of the clip so that the control rod 134 can be moved about a horizontal axis relative to the clip.

Forwardly of the hopper B (FIGS. 1 and 3) is a rod guide 156 that is mounted above the tongue 70 of the trailer by means of a bracket 158 that is rigidly secured to the tubular members 72. The rod guide 156 comprises a right angle member, as seen in FIG. 6, that is disposed with its apex directed rearwardly of the duster. The guide 156 has upstanding flanges 160 and 162 which are provided with vertically extending slots 164, 166, respectively, that are open at their upper ends. The slots are of such width as to loosely receive the control rod 134, for a purpose to be presently made clear.

At certain locations along the rod 134 (FIG. 3) are sets 168 and 169 of collars, each set having two cooperating collars 170 (FIG. 6) that are disposed in closely spaced relation on the rod 134 and are adjustably retained thereon by means of set screws 171. The locations of the sets of collars 168 and 169 on the control rod 134 correspond to positions of adjustment in which the control rod may be disposed. In order to move the boom end section 86 into the laterally extended condition as shown at the right hand side of FIG. 3 and to retain the section in such a condition, the tractor operator, from his position on the tractor, grasps the handle 136 and raises the control rod 134 out of the slot 164 in the rod guide 156. Next, by suitable endwise movement of the rod 134, which is attached by the angle clip 146 to the boom section 86 as previously explained, the boom section 86 is moved to laterally extended condition. The control rod is then slipped back into the slot 164 with one of the collars 170, of the set 168 nearest the handle 136, at each side of the rod guide flange 160. The end section 86 of the boom, which is attached by the universal joint 96 to the center boom section 82, is then retained in extended condition against horizontal pivotal movement. Even though the boom end section 86 is now locked in extended condition by the control rod 134, it can still be pivoted in a substantially vertical direction when necessary.

The other sets 169 and 169a of collars 170 are provided on the control rods 134 and 134a, respectively, closely adjacent the end of the rods which are attached to the boom end sections and these sets are used for the purpose of retaining the boom end sections 84 and 86 in the retracted condition as shown by the position of boom section 84 in FIG. 3. When the control rod 134a is disposed in the slot 164a of the left hand rod guide 156a with the collars 170a located at opposite sides of the flange 160a, the control rod 134a is locked against endwise movement. It will be understood that an intermediate position of the boom sections 84 and 86 may be obtained by disposing the control rod 134 in the slot 166a of the rod guide 156a, usually associated with rod 134a, with the collars 170 of the set 168, that is adjacent the handle 136, disposed at opposite sides of the flange 162a. In a similar manner the control rod 134a may be disposed in the slot 166 of the rod guide 156.

A plurality of the dust discharge nozzles N, which correspond in number to the nipples 42 on the blower C, are provided along the three sections 82, 84 and 86 of the boom 80 and are connected to the nipples for communication with the blower by lengths of hose or flexible tubing 178. The spacing of the nozzles on the boom corresponds to the spacing of the particular rows of plants to which dust is to be applied. Mounting brackets 180 are provided on the boom sections to retain the nozzles N in depending relation below the boom. Each nozzle mounting bracket 180 (FIGS. 7 and 8) is adjustable on the associated boom section and comprises a vertically disposed angle iron member 182 having a flange 184 (FIG. 8) drawn into clamping relation against the boom section by means of a U-shaped strap 186 which is disposed about the boom section and is attached by bolts 188 to the angle iron 182. The upper end of the angle iron 182 projects above the boom section and has the other flange 190 thereof disposed at an angle normal to the boom section. An L-shaped arm 192 of the bracket 180 is pivotally attached at one end to the flange 190 by means of a bolt 194 that is disposed in parallel relation to the boom section for movement of the arm in a direction normal to the boom section. The other end 196 of the arm 192 projects parallel to the boom section and is provided with a bolt 198 that extends transversely of the boom section. It will be noted (FIG. 7) that the boom end section 86 acts as a stop to limit the downward pivotal movement of the arm 192 about the pivot bolt 194. The end of the bolt 198 extending toward the rear of the duster is provided with an eye 200 (FIG. 7) that is disposed transversely of the bolt.

Nozzle mounting rods 202 are adjustably attached at one end to the nozzles N in any convenient manner, and at their other end are disposed in the eyes 200 of the bolts 198. Upon tightening of the bolts 198, the respective rods are drawn securely against a washer 204 that is disposed on each bolt 198 between the rod 202 and the end 196 of the arm 192. When the boom sections are in substantially coaxial alignment, the nozzle mounting brackets 180 permit pivotal movement of the nozzles, as indicated by the arrow in FIG. 7, in a direction opposite to the forward movement of the duster and about the pivot bolts 194 which are parallel to the boom sections 82, 84 and 86, permitting the nozzles to easily clear obstructions encountered in their path during dusting operations. The above described manner of attaching the nozzle mounting rods 202 to the brackets 180 permits adjustment in the elevation of the nozzles N, and in the transverse alignment of the nozzles by changing the rotary position of the rods in the bolt eyes 200. Another adjustment of the nozzles can be made by turning the bolts 198 about their axis in order to move the nozzles laterally of the duster.

A drive shaft 206 (FIG. 1) that is connected, in a well known manner, between the tractor (not shown) and the transmission 47 delivers power for driving the duster of the present invention. Adjacent the front end of the drive shaft 206 is a bearing 208 that is mounted on the boom control bracket 158 for the purpose of retaining the front end of the shaft in operative position. Suitable gearing (not shown) of the transmission 47 operatively connects the dust feed mechanism 32 and the shaft 46 of the impeller 44 for simultaneous operation.

The spacing of the wheels 58 and 58a of the trailer T which can be adjusted without removing the weight of the duster from the body members 48 and 50 permits easy adjustment of the trailer tread to accommodate the pesticide distributor apparatus of the present invention for use on crops having different row spacings. The improved brackets 180 by which the nozzles N are mounted in operative position on sections of the boom 80 enable the nozzles to be pivoted harmlessly out of the way should the nozzles encounter an obstruction during dusting operations. The boom controls 130 and 132 by which the boom sections 84 and 86 may be easily manipulated by the tractor operator from his position on the tractor permit the boom sections to be positively held in either retracted or extended position.

The present invention is not to be limited by the fact that a particular embodiment thereof has been shown and described since various changes and modifications may be made in the details of the apparatus without departing from the spirit and scope of the appended claims.

Havings thus described the invention, what is claimed as new and desired to protect by Letters Patent is:

1. In combination in mobile apparatus for distributing powdered material, an elongated boom disposed in substantially horizontal position, pivot means mounted on said boom and having a pivot axis extending substantially parallel to said boom, and discharge nozzle mounting means disposed on said pivot means and arranged to pivotably support a discharge nozzle in operative position in depending relation at the trailing side of said boom, said nozzle mounting means having abutting relation with said boom section when said nozzle is in said depending operative position.

2. In combination in mobile apparatus for distributing powedered material, a boom section disposed in a substantially horizontal position, pivot means disposed on said boom section forwardly of said section and having an axis extending substantially parallel to said boom section, an arm extending rearwardly across the upper surface of said boom section and disposed in abutting relation with said upper surface, said arm being pivotally mounted on said pivot means for movement in a direction transversely of said boom section, and a rod disposed on said arm at the other end thereof and arranged to support a discharge nozzle of said apparatus in depending relation rearwardly of said boom section.

3. In combination in mobile apparatus for distributing powdered material, a boom section disposed in substantially horizontal position, pivot means disposed on said boom section and having a pivot axis disposed on the forward side of said boom section and extending substantially parallel to said boom section, an arm pivotally mounted at one end on said pivot means for pivotal movement in a direction transverse with respect to said boom section, said arm being arranged to extend toward the rear side of and in abutting relation with an upper surface of said boom section, a nozzle mounting rod disposed in depending relation at the rear side of said boom section, and adjusting means on said arm spaced from said pivot axis and arranged to engage said rod and retain said rod in any position of rotary adjustment of the rod about its own axis.

4. In a mobile distributor for powdered material, an elongated boom section disposed in a substantially horizontal position, pivot means disposed on said boom section and having an axis forwardly of said section and extending substantially parallel to said section, an arm disposed at one end on said pivot means and arranged to move transversely of said boom section, said arm extending rearwardly of said boom section and in abutting relation with an upper surface of said boom section, a nozzle mounting rod disposed in depending relation rearwardly of said boom section, adjustable attaching means for said mounting rod disposed on the other end of said arm, said mounting rod attaching means being arranged to permit lateral adjustment of said mounting rod in a direction endwise of said boom section.

5. In a mobile distributor for powdered material, a boom section disposed in substantially horizontal position, pivot means mounted on the forward side of said boom section and having an axis extending substantially parallel to said boom section, an arm pivotally connected on said pivot means and arranged for movement in a direction transverse with respect to said boom section, said arm extending rearwardly of and in abutting relation with an upper surface of said boom section, a nozzle mounting rod arranged to support a discharge nozzle in depending relation rearwardly of said boom section, adjustable attaching means disposed on the other end of said arm and arranged to mount said rod on said arm, said attaching means having a pivotal axis disposed transversely of said boom section and arranged to retain said rod in any position of rotary adjustment about said attaching means axis.

6. In combination in an apparatus for distributing powdered material, an elongated boom section disposed in substantially horizontal position, a bracket member adjacent one side of said boom section, clamping means mounting the bracket member on the boom section for angular adjustment about said boom section and for retaining the bracket member in selected position of such adjustment, a discharge nozzle mounting rod disposed in depending relation with respect to said boom section adjacent the opposite side thereof, and means adjustably interconnecting said rod and said bracket member and arranged to permit pivotal movement of said rod about axes which are mutually perpendicular to each other, one of said axes being disposed substantially parallel with respect to said elongated boom section.

7. In a distributor for powdered material, a support structure, an elongated boom section, pivot means arranged to mount said boom section on said support structure for universal pivoting movement, means connected between said support structure and said boom section and arranged to retain said boom section against movement thereof below a substantially horizontal position, an elongated control rod attached at one end to said boom section and arranged to pivot universally relative to said boom section, a rod guide disposed on said support structure laterally of said boom section, said rod guide having a slot therein arranged to receive said rod, and a plurality of retaining means on said rod disposed on predetermined spaced portions of said rod and arranged to be selectively engaged with said rod guide means when said rod is disposed in said slot for retaining said boom section in selected positions of horizontal adjustment.

8. In a distributor for powdered material, a support structure, an elongated boom section, means at one end of said boom section mounting said section on said structure for pivotal movement about a substantially vertical axis, an elongated control rod connected to said boom section and arranged to move said boom section horizontally about said axis, a rod guide for said control rod disposed on said support structure laterally of said boom section, and cooperating means on said rod and on said rod guide arranged to releasably retain said rod at predetermined locations for disposition of said boom section in selected positions of horizontal adjustment about said axis.

9. In a distributor for powdered material, a centrally disposed boom section, a boom end section mounted adjacent each end of said central section for pivotal movement about a substantially vertical axis adjacent an end of the end section, an elongated control rod for each of said end sections, means connecting each of said control rods to the associated boom end section for universal pivotal movement with respect thereto, oppositely disposed control rod guide means mounted in fixed relation to and laterally spaced from said central section and arranged to receive said control rods, and cooperating means on said control rods and on said rod guides arranged to releasably retain said rods in predetermined locations of axial adjustment corresponding to selected positions of adjustment of said boom end sections about their respective vertical axes.

10. In combination, a pair of elongated body members disposed in a substantially horizontal position and in side by side relation, a distributor mechanism supported on said members, a projecting member disposed in fixed position on the inner end of each of said body members, the projecting member of each body member being disposed in overlying sliding relation with the other body member at opposite sides of said distributor mechanism, and a support leg on the outer end of each of said body members, said body members being arranged to be adjusted endwise relative to each other to vary the spacing between said support legs.

11. In combination in a mobile powder distributing apparatus, a pair of elongated body members arranged in juxtaposed sliding engagement in a substantially horizontal position, a powder distributing mechanism on said members, a projecting member disposed in fixed relation on each of said body members and located adjacent the inner end thereof, the projecting member of each body member being arranged to overlie the other of said body members and disposed for sliding movement along the upper surface of said other body member, a wheel disposed in supporting relation below each of said body members, said body members being arranged for endwise sliding adjustment relative to each other to vary the spacing between said wheels, and a tongue projecting from said body members for drawing the apparatus.

12. In combination in a mobile powder distributing apparatus, a pair of elongated body members arranged in juxtaposed sliding engagement in a substantially horizontal position, a powder distributing mechanism mounted on said body members, a projecting member disposed in fixed relation on each of said body members, the projecting members of each body member being arranged to overlie the other of said body members and disposed for sliding movement therealong, a depending leg disposed on each of said body members, each leg being located adjacent one end of the associated body member remote from the projecting member thereon, wheel mounting means disposed on each of said legs in substantially parallel relation with respect to the associated body member, a ground engaging wheel disposed on the wheel mounting means of each of said legs, and a tongue projecting from said body members for drawing the apparatus.

13. In a distributor for powdered material, a frame structure, a horizontally disposed beam in said frame structure extending longitudinally thereof, a pair of elongated slide bars arranged in juxtaposed sliding relation, said slide bars being disposed in transverse relation with respect to said beam and in substantially horizontal position therebelow, means for clamping said bars to said beam, a projecting member disposed in fixed relation on each of said slide bars, the projecting member of each bar being arranged to overlie the other of said slide bars in sliding relation therewith, said projecting members being at opposite sides of said beam, a depending leg disposed on each of said slide bars remotely of said projecting member thereon and at opposite sides of said frame structure, wheel mounting means disposed on each of said legs, a ground engaging wheel disposed on each of said wheel mounting means, and a tongue associated with said slide bars and disposed longitudinally with respect to said beam for drawing said apparatus.

14. In a pesticide distributor apparatus, a frame structure, a horizontally disposed beam in said frame structure extending longitudinally thereof, a pair of elongated slide bars arranged in juxtaposed sliding relation, said slide bars being disposed in transverse relation with respect to said beam and in substantially horizontal position therebelow, a projecting member disposed in fixed relation on each of said slide bars, the projecting member of each bar being arranged to overlie the other of said slide bars in sliding relation therewith, said projecting members being at opposite sides of said beam, a leg disposed on each of said slide bars at opposite sides of said frame structure remotely of said projecting member on the associated bar, wheel mounting means disposed on each of said legs in substantially parallel relation with the respective one of said slide bars, a ground engaging wheel disposed on each of said wheel mounting means in apparatus supporting relation, clamping means disposed below said juxtaposed slide bars and arranged to releasably secure said bars in fixed relation to said beam, and a tongue pivotally attached to said clamping means and disposed longitudinally with respect to said beam and substantially centrally of said transverse slide bars.

15. In combination, a frame structure, a horizontally disposed beam in said frame structure extending longitudinally thereof, a pair of elongated slide bars arranged in juxtaposed sliding relation, said slide bars being disposed in transverse relation with respect to said beam and in substantially horizontal position therebelow, a projecting member disposed in fixed relation on each of said slide bars, the projecting member of each bar being arranged to overlie the other of said slide bars in sliding relation therewith, said projecting members being at opposite sides of said beam, a leg disposed on each of said slide bars at opposite sides of said frame structure remotely of said projecting member thereon, wheel mounting means disposed on each of said legs in substantially parallel relation with the respective one of said slide bars, a ground engaging wheel disposed on each of said wheel mounting means, a tongue pivotally attached to said slide bars for vertical adjustment, said tongue being disposed longitudinally with respect to said frame structure, a spacer disposed in fixed position between said frame structure and said tongue and adapted to retain said tongue in a predetermined angular relation relative to said frame structure, a transversely disposed nozzle mounting boom on said frame structure, oppositely disposed elongated end sections in said boom, means at one end of each of said boom sections arranged to mount the respective section for pivotal movement about a vertical axis, an elongated control rod for each of said boom sections, means arranged to connect each of said control rods to the associated one of said boom sections for universal pivotal movement of said control rods with respect to said boom sections, oppositely disposed control rod guide means located adjacent one end of said apparatus and arranged to receive said control rods for axial adjustment therein, means on said tongue forwardly of said frame structure adapted to mount said guide means in spaced relation thereabove, and cooperating means on said control rods and on said rod guides arranged to releasably retain said boom sections in predetermined positions of angular adjustment about said vertical axes.

16. In combination, a frame structure, a base disposed in supporting relation below said frame structure, said base being extensible laterally relative to said frame structure, a vertically adjustable boom center section disposed transversely on said frame structure, a boom end section disposed at opposite ends of said boom center section, pivot means connecting each boom end section to said boom center section for horizontal pivotal mvement, and a rigid rod pivotally disposed at one end on each of said end sections and arranged to adjustably engage said frame structure to retain said end sections in selected positions of angular adjustment relative to said boom center section.

17. In a powdered material distributing device, a support structure, a nozzle mounting boom disposed in spaced relation to said support structure, a pivot member rotatably mounted on said support structure transversely thereof and adjacent said boom, adjusting means for said boom disposed in operative engagement between said support structure and said pivot member and arranged to effect rotary movement of said pivot member, and arms mounted on said pivot member adjacent the opposite ends and extending radially thereof into supporting engagement with said boom for moving said boom upon actuation of said adjusting means.

18. In a powdered material distributing device, a support structure, a distributor nozzle mounting boom spaced from said support structure, a vertically disposed member mounted on said boom to extend substantially normal thereto, a pivot member rotatably mounted on said support structure transversely thereof and adjacent said boom, adjusting means for said boom disposed in operative engagement between said support structure and said pivot member and arranged to effect rotary movement of said pivot member, an arm mounted on said pivot member and extending radially thereof into pivotal supporting engagement with the upper end of said vertically disposed member on said boom, and a link pivotally interconnecting said vertically disposed member adjacent the lower end thereof and said support structure.

19. In a powder material distributing device, a support structure, a first distributor nozzle mounting boom section spaced from said support structure and having a fixed transverse position relative to the support structure, a second boom section pivotally mounted at one end on said first boom section for horizontal movement, a pivot member rotatably mounted on said support structure transversely thereof and adjacent said first boom section, adjusting means for said first boom section disposed in operative engagement between said support structure and said pivot member and arranged to effect rotary movement of said pivot member, an arm mounted on said pivot member and extending radially thereof into pivotal supporting engagement at its free end with said first boom section, an elongated control rod pivotally connected to said second boom section and arranged to move said second boom section horizontally about its pivotal mounting, a rod guide for said control rod disposed on said support structure laterally of said boom sections, and cooperating means on said rod and on said rod guide arranged to releasably retain said rod at predetermined locations for disposition of said second boom section in selected positions of adjustment about said pivotal mounting.

20. In a mobile apparatus for distributing powdered material, the combination comprising: an elongate boom disposed in substantially horizontal position, pivot means mounted on said boom adjacent one side thereof and having a pivot axis extending substantially parallel to said boom, and nozzle mounting means on said pivot means pivotally supporting a discharge nozzle in operative position and in depending relation adjacent the opposite side of said boom, said nozzle mounting means having abutting relation with said boom when said nozzle is in said depending operative position.

21. In combination in an apparatus for distributing powdered material, an elongate substantially horizontal boom, a generally upstanding member, clamping means retaining the upstanding member for angular adjustment on said boom, said upstanding member having one end extending above said boom, mounting means pivotable on said one end of said upstanding member about a first axis substantially parallel to said boom and arranged to be moved pivotally in a direction normal to the axis of said boom, and a pesticide distributor nozzle mounted on said mounting means and pivotable about a second axis extending perpendicularly to and intersecting said first axis.

22. In combination in a mobile apparatus for distributing powdered material, a substantially horizontal boom section, pivot means on said boom section forwardly of said section and having an axis extending substantially parallel to said boom section, and an arm pivotally mounted on said pivot means for movement in a direction transverse with respect to said boom section, said arm extending rearwardly across the upper surface of said boom section in abutting relation therewith to support a discharge nozzle in operative position.

23. In a distributor for powdered material, a support structure, an elongate boom section, means at one end of said boom section mounting said section on said structure for pivotal movement about a substantially vertical axis, an elongate control rod connected to said boom section and arranged to move said boom section about said axis, and cooperating means on said rod and on said support structure and arranged to releasably retain said rod at predetermined locations for retention of said boom section in selected positions of horizontal adjustment about said axis.

24. In a distributor for powdered material, a centrally disposed boom section, opposite elongate boom end sections, means connecting one end of each of said boom end sections to the adjacent end of said central boom section and mounting each of said boom end sections for pivotal movement about a substantially vertical axis, an elongate control rod for each of said boom end sections, means arranged to connect each of said control rods to the respective boom end section for universal pivotal movement of the control rod with respect to the associated boom end section, and cooperating means on said control rods and on said support structure and arranged to releasably retain said rods in predetermined locations of axial adjustment corresponding to selected positions of horizontal adjustment of the boom end sections about their respective vertical axes.

25. In a pesticide distributing apparatus, a frame structure including a horizontal beam extending longitudinally thereof, a pair of elongate slide bars arranged in juxtaposed sliding relation with each other, said slide bars being in transverse relation with respect to said beam and in substantially horizontal position therebelow, a projecting member fixed to each of said slide bars, the projecting member of each slide bar being arranged to overlie the other of said slide bars in sliding relation therewith, said projecting members being at opposite sides of said beam, a leg on each of said slide bars, said legs being at opposite sides of said frame structure remotely of said projecting member on the associated bar, wheel mounting means on each of said legs in substantially parallel relation with the respective one of said slide bars, a ground engaging wheel on each of said wheel mounting means in apparatus supporting relation, clamping means below said juxtaposed slide bars and arranged to releasably secure said bars in fixed relation to said beam, a tongue pivotally attached to said clamping means and disposed longitudinally with respect to said beam and substantially centrally of said transverse slide bars, and a spacer fixed to said beam and said tongue and adapted to retain said tongue in predetermined angular relation with respect to said beam.

26. In a pesticide distributor, a boom section disposed in substantially horizontal position, mounting means mounted on the boom section for free pivotal movement, a pesticide distributor nozzle and intermediate means connecting said nozzle to said mounting means and mounting said nozzle thereon for pivotal movement about axes perpendicular to each other and extending transversely of said boom section.

27. In combination, a pair of elongated body members disposed laterally adjacent each other in substantially horizontal position, an inner end portion of each body member having bearing engagement with the other body member, fluid distributing apparatus supported by said body members between said inner end portions to urge the inner end portion of each body member downwardly against the other body member, and a support leg on the outer end portion of each of said body members, said inner end portions being effective to retain said body members for lengthwise adjustment relative to each other to vary the spacing between the legs.

28. In combination, a frame structure, a boom center section disposed on and extending transversely of said frame structure, a boom end section disposed adjacent opposite ends of said boom center section, pivot means connecting each boom end section to said boom center section for horizontal pivotal movement, and a control rod pivotally connected at one end to each of said boom end sections and arranged to adjustably engage said frame structure to retain said boom end sections in selected positions of angular adjustment relative to said boom center section.

References Cited in the file of this patent

UNITED STATES PATENTS

| | | |
|---|---|---|
| 139,550 | Cronin | June 3, 1873 |
| 1,526,642 | Nissley | Feb. 17, 1925 |
| 2,400,703 | Messinger | May 21, 1946 |
| 2,541,417 | Hartsock | Feb. 13, 1951 |
| 2,619,379 | Skifte | Nov. 25, 1952 |
| 2,691,236 | Tuft | Oct. 12, 1954 |
| 2,767,995 | Stout | Oct. 23, 1956 |